United States Patent

West et al.

[11] Patent Number: 5,845,259
[45] Date of Patent: *Dec. 1, 1998

[54] ELECTRONIC COUPON DISPENSING SYSTEM

[75] Inventors: Jack T. West, Livonia; Allen P. Warner, Farmington Hills; Katherine A. West, Livonia, all of Mich.

[73] Assignee: Electronic Consumer Concepts, L.L.C., Southfield, Mich.

[*] Notice: This patent issued on a continued prosecution application filed under 37 CFR 1.53(d), and is subject to the twenty year patent term provisions of 35 U.S.C. 154(a)(2).

[21] Appl. No.: 671,519

[22] Filed: Jun. 27, 1996

[51] Int. Cl.$^6$ .................................. G07B 1/00; G07F 7/00
[52] U.S. Cl. ........................ 705/14; 705/16; 705/21; 364/479.04; 364/479.05; 364/479.06; 235/381; 235/383
[58] Field of Search .................................... 395/214, 216, 395/221, 222; 364/479.01, 479.02, 479.04, 479.05, 479.06, 479.07; 235/375, 379, 380, 381, 383, 384, 385; 705/14, 16, 21, 22

[56] References Cited

U.S. PATENT DOCUMENTS

| | | | |
|---|---|---|---|
| Re. 34,915 | 4/1995 | Nichtberger et al. | 395/214 |
| 4,674,041 | 6/1987 | Lemon et al. | 395/214 |
| 4,723,212 | 2/1988 | Mindrum et al. | 395/214 |
| 4,833,308 | 5/1989 | Humble | 235/383 |
| 4,882,675 | 11/1989 | Nichtberger et al. | 395/214 |
| 4,896,791 | 1/1990 | Smith | 364/479.05 |
| 4,910,672 | 3/1990 | Off et al. | 395/214 |
| 4,949,256 | 8/1990 | Humble | 395/214 |
| 5,013,897 | 5/1991 | Harman et al. | 235/381 |
| 5,025,139 | 6/1991 | Halliburton, Jr. | 235/379 |
| 5,091,634 | 2/1992 | Finch et al. | 235/375 |
| 5,095,195 | 3/1992 | Harman et al. | 235/381 |
| 5,119,294 | 6/1992 | Tanaka | 395/221 |
| 5,173,851 | 12/1992 | Off et al. | 395/214 |
| 5,176,224 | 1/1993 | Spector | 186/52 |
| 5,185,695 | 2/1993 | Pruchnicki | 395/214 |
| 5,192,854 | 3/1993 | Counts | 235/375 |
| 5,237,157 | 8/1993 | Kaplan | 235/375 |
| 5,249,044 | 9/1993 | Von Kohorn | 395/214 |
| 5,305,195 | 4/1994 | Murphy | 395/201 |
| 5,305,197 | 4/1994 | Axler et al. | 395/214 |
| 5,353,218 | 10/1994 | De Lapa et al. | 395/214 |
| 5,368,129 | 11/1994 | Von Kohorn | 235/383 |
| 5,380,991 | 1/1995 | Valencia et al. | 235/383 |
| 5,408,417 | 4/1995 | Wilder | 395/205 |
| 5,440,479 | 8/1995 | Hutton | 395/226 |
| 5,459,306 | 10/1995 | Stein et al. | 235/383 |
| 5,483,049 | 1/1996 | Schulze, Jr. | 395/214 |
| 5,502,636 | 3/1996 | Clarke | 395/214 |
| 5,515,270 | 5/1996 | Weinblatt | 395/214 |
| 5,557,721 | 9/1996 | Fite et al. | 395/214 |
| 5,581,064 | 12/1996 | Riley et al. | 235/383 |

*Primary Examiner*—Eric W. Stamber
*Attorney, Agent, or Firm*—Harness, Dickey & Pierce PLC

[57] ABSTRACT

A cost-effective, in-store coupon dispensing system that increases coupon redemption rates and product turns. The system includes a point of sale system including a terminal having a data reader for reading transaction data, and a system memory for storing read transaction data. An electronic coupon dispenser includes a memory for electronically storing a plurality of coupons, one or more user interfaces for permitting selection of any of the plurality of coupons from a coupon menu, and one or more printers for printing coupons elected at the user interface. The coupon dispenser generates coupon-related data based on user interface selections and coupons printed by the system. A central data base facility is operatively connected to the point of sale system for downloading coupon redemption data and to the electronic coupon dispenser for downloading the coupon-related data. The central data base facility communicates with the electronic coupon dispenser in response to first predetermined parameters and with the point of sale system in response to second predetermined parameters. The coupon dispensing system of the present invention finds particular utility in grocery stores or other stores having inventory having limited shelf life.

21 Claims, 7 Drawing Sheets

ELECTRONIC COUPON DISPENSING SYSTEM

BACKGROUND OF THE INVENTION

1. Technical Discussion

The present invention relates generally to menu driven information retrieval systems, and more particularly to an in-store coupon dispensing system that generates and dispenses coupons based on consumer made menu selections, that transmits coupon-related data to a central data base for processing and dissemination, and that effectively targets in-store consumers.

2. Discussion

The number of coupons that are annually printed and distributed has increased steadily in recent years. For example, in 1994, over three hundred billion coupons were printed and distributed through magazines, newspapers and flyers, providing consumers with purchasing incentives and discounts on items ranging from food products to professional services. Distribution of coupons provides manufacturers with not only an effective way to generate consumer purchasing incentives, but also with alternate channels for advertising and creation of brand recognition.

Despite the number of coupons that are annually printed and distributed, historically only a small percentage, typically between two and five (2%–5%) percent, are actually redeemed. Several reasons are attributed to this low rate of redemption. First, because most coupons are distributed through magazines, newspapers and other distributed printed media, consumers typically discover the coupons at home, work or other areas remote from stores in which the coupons may be redeemed. Thus, the coupons do not typically generate impulse-based sales. Second, many consumers prefer not to deal with the inconvenience of clipping coupons and saving the coupons until the need for a particular product arises. If the consumer does not have a present need for a product, there is lack of incentive to save the coupon.

Conventional preprinted paper coupons are also inconvenient for stores for several reasons. First, coupons are printed months in advance, thereby giving stores and manufacturers no flexibility in providing consumer purchasing incentive for a particular product on a given day. Second, if a particular product is sold out in response to a coupon offering, the store typically must issue rainchecks for the product when supply does not equal demand. Third, preprinted paper coupons have a lengthy float period between coupon redemption and store reimbursement. Typically, coupons must be manually collected from each individual store, counted and processed through processing facilities and clearing houses before a reimbursement amount is calculated and the manufacturer provides payment to the store. Ultimately, the cost of the float period and the associated processing is borne by both the manufacturer and the store.

Recently, an attempt has been made to dispense coupons at the point of sale based in part on consumer purchasing characteristics. Systems, such as the system created and marketed by the Catalina Marketing Corporation under the name of Checkout Coupon® and Checkout Direct®, and disclosed in U.S. Pat. Nos. 4,723,212, 4,910,672, and 5,173,851, are integrated with, and generate coupons at, point of sale (POS) terminals in response to bar code data scanned in or manually entered from the product being purchased. The POS generated coupons provide purchasing consumers with incentive to purchase competitive brand products rather than consumer brands of choice.

However, systems such as the above system have associated limitations. First, coupons are generated in response to data collected from the product itself, and thus are not related to the present shopping needs of the consumer. Second, existing point of sale software must be significantly modified to accommodate such a system. Third, such a system provides no direct interaction between the retailer and the manufacturer. The retailer cannot respond to immediate store or manufacturer needs, as coupons are generated based on agreements between the product manufacturers and the service provider made well in advance of the coupon printing.

In view of the aforementioned, a need exists to provide a coupon dispensing system that generates and dispenses coupons based directly on immediate consumer wants and needs. In particular, there is a need for a coupon system that combines the benefits of preprinted paper coupons with the benefits of an in-store coupon generating system that tracks consumer coupon selection trends. There is a need for an in-store coupon generating system that can generate coupons with varying short-term expiration dates. In addition, there is a need to be able to limit the number of coupons dispensed, with an initial set number or in response to consumer demand. There is also a need to target dissemination of coupons to specific geographic areas, chains or stores. In addition, there is a need for a coupon dispensing system that reduces the float period associated with store coupon reimbursement, thereby making the generation and dispensing of coupons a more profitable endeavor for both the retailer and the manufacturer. Further, there is a need for a coupon dispensing system that can respond on a same-day basis to changing inventory and/or consumer purchasing conditions or trends on an individual store or chain-wide basis. Finally, there is a need for a coupon dispensing system that is capable of downloading data from both a POS system and the coupon dispensing system to provide manufacturers with coupon redemption data with minimal associated programming changes to existing POS system software.

SUMMARY OF THE INVENTION

Figure 1:
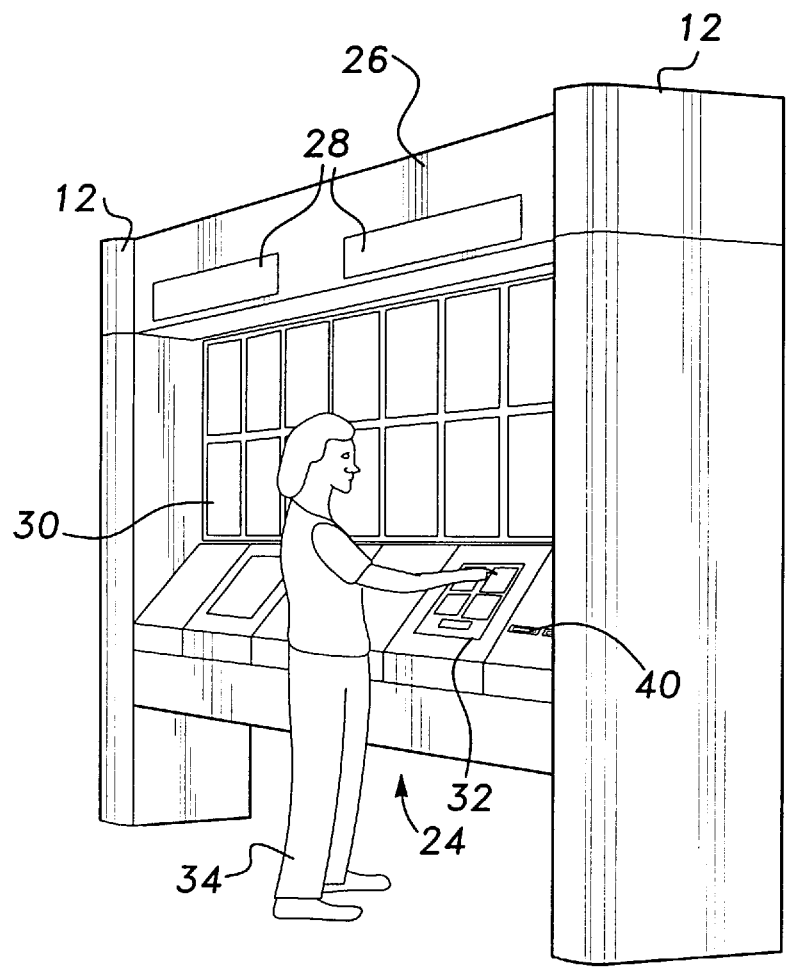
FIG. 1 is a perspective view of a stand-alone electronic coupon dispensing machine (ECDM) according to a preferred embodiment of the present invention.

In response to the foregoing needs, the present invention provides an in-store coupon dispensing system that dispenses coupons based on consumer made menu selections. The coupon dispensing system of the present invention provides the advertising and brand recognition of preprinted paper coupons, and appeals to the immediate needs of the in-store consumer, thereby increasing the likelihood of coupon redemption. The coupon dispensing machine of the present invention generates coupons with any expiration date, e.g., daily, weekly, or monthly, based upon each advertiser's specific marketing needs. In addition, the coupon dispensing machine of the present invention can limit the number of coupons dispensed, based upon an initial number or consumer demand, as set by the advertiser. Also, coupons can be disseminated to any level, e.g., by geographic region, city, chain, store, or any defined set of stores within one or more geographic region, city or chain. In addition, the coupon dispensing system of the present invention collects data based on the number of coupons dispensed and redeemed for particular products, in addition to data relating to consumer-made menu selections. The coupon dispensing system of the present invention requires only minimal interfacing with existing store POS systems or store central office systems for capturing and downloading coupon redemption data in real-time or batch mode on a periodic basis to a central data base.

Further, the coupon dispensing system of the present invention permits a store to suspend dispensing of a particular coupon or coupons based on inventory status or other individual store conditions. The coupon dispensing system of the present invention also permits the store to respond quickly to everchanging consumer buying trends, in that a coupon for a particular product or products may be added to, or deleted or temporarily suspended from, the system menu through software-implemented changes on a same-day basis. By including a centrally located data base, the coupon dispensing system may gather coupon redemption data from the store or chain central office and transmit the data on-line or in batch mode to the manufacturer or retailer, thereby eliminating the need for the manual collection and clearing house counting procedures associated with conventional paper coupons.

In particular, the present invention provides an in-store coupon dispensing system that increases coupon redemption rates and product turns. The system includes a point of sale terminal including a data reader for reading transaction data, and a point of sale terminal memory for storing read transaction data. An electronic coupon dispensing machine includes a memory for electronically storing a plurality of coupons, one or more user interfaces for permitting selection of any of the plurality of coupons from a coupon menu, and one or more printers for printing coupons elected at the user interface. A central data base facility downloads coupon data to, and uploads transaction and coupon-related data from, the electronic coupon dispensing machine via a first communication link between the central data base and the electronic coupon dispensing machine.

DETAILED DESCRIPTION OF THE PREFERRED EMBODIMENT

Figure 2:
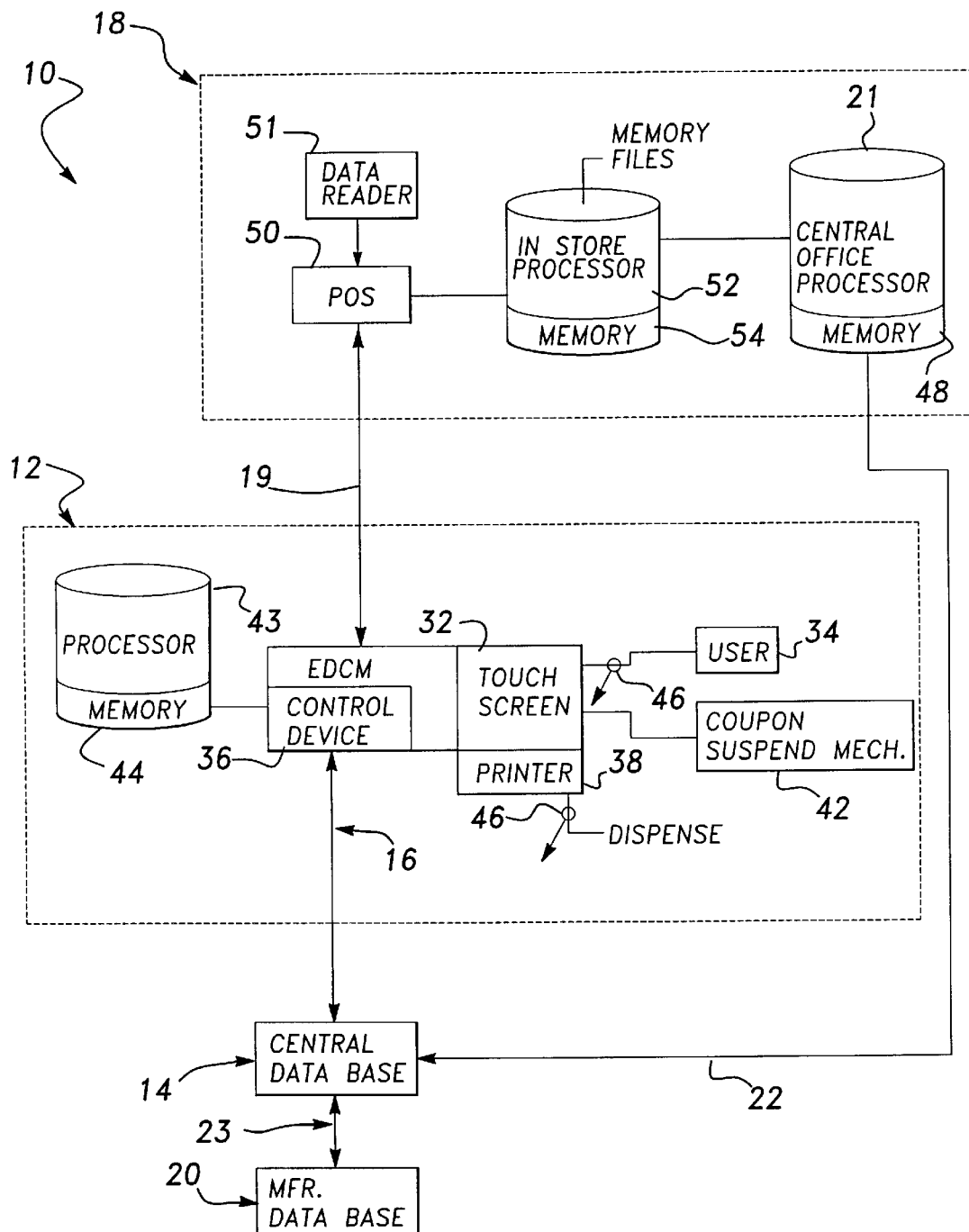
FIG. 2 is a block diagram of an electronic coupon dispensing system according to a preferred embodiment of the present invention.

Referring to FIGS. 1 and 2, an electronic coupon dispensing system according to a preferred embodiment of the present invention is shown generally at 10. The system 10 controls the operation of an associated electronic coupon dispensing machine (ECDM) 12. The coupon dispensing system 10 finds particular utility in grocery stores, as the features of the system 10 allow grocery stores to attain quick product turns for fresh juices, packaged meats and other items having limited shelf life. The coupon dispensing system 10 also provides stores with control over coupon distribution for particular items by reducing the time required to add, delete or temporarily suspend coupons for particular items. It should be appreciated that the term "stores" used throughout refers to retail outlets such as grocery stores, wholesale outlets, or any other entity or facility at which consumers purchase goods and services. It should also be appreciated that the term "manufacturers" used throughout refers to distributors, suppliers, wholesalers or any producers or providers of the goods or services marketed and sold through the above stores.

Still referring to FIGS. 1 and 2, the electronic coupon dispensing system 10 includes a central data base facility 14 for controlling the coupon dispensing system. The ECDM communicates with the central data base facility via a communication link 16. In addition to the central data base, the system also includes a conventional store POS system 18 connected to the ECDM via a communication link 19. The store POS system 18 includes a central office processor 21 of the type typically interconnecting a particular chain of stores. The central office processor 21 is connected to the central data base facility 14 via a communication link 22. The system 10 also includes a remote manufacturer coupon redemption data base facility 20 which communicates with the central data base 14 via a communication link 23. Each of the aforementioned components of the coupon dispensing system of the present invention will be described in detail below.

Referring again to FIGS. 1 and 2, the ECDM 12 includes a housing 24 including a headboard 26 having conventional scrolling LED billboards 28 for coupon promotional purposes. The housing 24 also includes a display panel 30, such as a translite display panel, for displaying products or manufacturer categories having coupons available from the ECDM. Alternatively, the display panel could include monitors for displaying pre-recorded advertisements or infomercials. The ECDM also includes one or more coupon selection menus, such as a touch screen 32 preferably of the type commercially available from Elosystems, Inc., permitting one or more consumers 34 to concurrently select from the data base of electronically stored coupons stored in an ECDM control device 36. The ECDM 12 also includes one or more printers 38 preferably of the type newly developed from Axiohm, Inc. or Practical Automation, Inc. for printing the coupons selected by the consumer 34 from the touch screen 32. A coupon dispense slot 40 is located adjacent each touch screen 32 for dispensing printed consumer-selected coupons.

The ECDM also includes a local coupon suspend mechanism, implemented through a keyboard 42 or through a touch screen 32, for permitting store management to temporarily suspend distribution of a coupon or coupons electronically stored in the ECDM control device 36 in response to sell out conditions to minimize the necessity of distributing rainchecks for sold out products during a coupon promotion. Preferably, the coupon suspend mechanism 42 or 32 is the only input for store management. Thus, all ECDM changes are made from the central data base 14. As a result, the system of the present invention requires minimal on-site maintenance.

The ECDM control device 36 is preferably a conventional personal computer of the type well known in the art, including a processor 43, such as the Intel Pentium® processor and conventional random access memory (RAM), read only memory (ROM) or any other conventional computer memory, as shown generally at 44. The control device also includes associated sensors 46 for generating coupon-related data such as coupon print data and menu selection data. The sensors transmit this generated data to the control device memory 44 for storage and later downloading to the central data base, as will be described below. The ECDM is programmed through well-known software programming techniques performed at the central data base facility and downloaded to the control device 36. It is contemplated that a plurality of ECDMs will be implemented and in communication with a single central data base facility, with each ECDM being controlled separately or on a chainwide basis.

Referring to FIG. 2, the central data base facility 14 is remotely located from the ECDM 12. The central data base facility 14 is maintained by Electronic Consumer Coupons, Inc., assignee of the present invention, or by an authorized licensee or representative. As described above, ECDM changes and available coupon selections are implemented at the central data base facility and downloaded to the ECDM via the communication link 16. Preferably, the communication link 16 is a conventional high data rate telephone line connection using two modems. However, this link may also be a wireless data link or any other conventional analog or digital link, such as a conventional network scheme, or a satellite or internet connection, capable of transmitting data between system components. Coupons may be electronically added, deleted or changed in the ECDM control device 36 by the central data base facility 14 through conventional software programming techniques in response to sale of new coupon space to or changes in existing coupon space by manufacturers. The central data base facility 14 also receives coupon-related data from the ECDM 12 either continuously or in batch mode, as will be described in detail below.

The central data base facility 14 also communicates with one or more manufacturer data bases 20 and one or more central office processors 21 via the communication links 22, 23 which are of the type similar to the communication link 16. The central data base 14 downloads coupon redemption data and other product data to the manufacturer data base 20 from the ECDM 12 either on line or on a batch mode basis. Similarly, the central office processor 21, which is preferably a conventional mainframe computer interconnecting a chain of stores and having a file memory 48, downloads coupon-related data to the ECDM 12 or the central data base 14 or the store POS controller or in store processor 52 described below downloads coupon-related data to the ECDM 12 depending upon predetermined manufacturer/store download parameters. Such data is useful for marketing purposes and for minimizing coupon redemption costs.

Still referring to FIG. 2, the POS system 18 includes one or more conventional POS terminals 50 each including a data reader 51, which is preferably a bar code reader. The POS system 18 also includes a local POS controller or in store processor 52 having an associated memory 54 for storing POS data, including coupon redemption data, read by the data reader 51 until the data is downloaded to the memory 48 or the ECDM 12. The store central office processor memory 48 receives and stores downloaded POS data from the POS memory 54 as described below. An advantage of the present invention is that the software associated with the POS system 18 need only be minimally altered to facilitate communication with the ECDM 12 through communication link 19, which is of the type similar to communication link 16. Thus, the coupon dispensing system of the present invention is essentially a stand alone system that does not interfere with presently implemented coupon systems and that requires only periodic downloading of coupon redemption data from the store central office processor memory 48 to the central data base facility 14, or from the POS controller or in store processor 52 to the ECDM 12 to the central data base facility 14, where communication link 22 is of the type similar to communication link 16.

Referring to FIGS. 3A–3E, screens appearing to the consumer on touch screen 32 are shown. As shown at 60 in FIG. 3A, an introductory screen invites store shoppers to utilize the coupon dispensing system 10 by touching the touch screen 32. As shown at 62 in FIG. 3B, a select language screen may appear allowing the consumer to select a particular language for the coupon selection process. As shown at 64 in FIG. 3C, once a language is selected, the next successive screen introduces product categories. The screen 66 in FIG. 3D displays products from the categories in FIG. 3C having associated coupons available to the consumer. The screen 68 in FIG. 3E appears after the consumer selects one of the products in FIG. 3D, offering the user specific coupons for the products selected. If a screen selection is not made by the consumer at the screens shown in FIGS. 3A–3E within a predetermined amount of time, the system defaults to the introductory screen.

Figure 3A:
FIGS. 3A–3E illustrate successive screens appearing in response to user selection on the ECDM of FIG. 1.
Figure 3B:
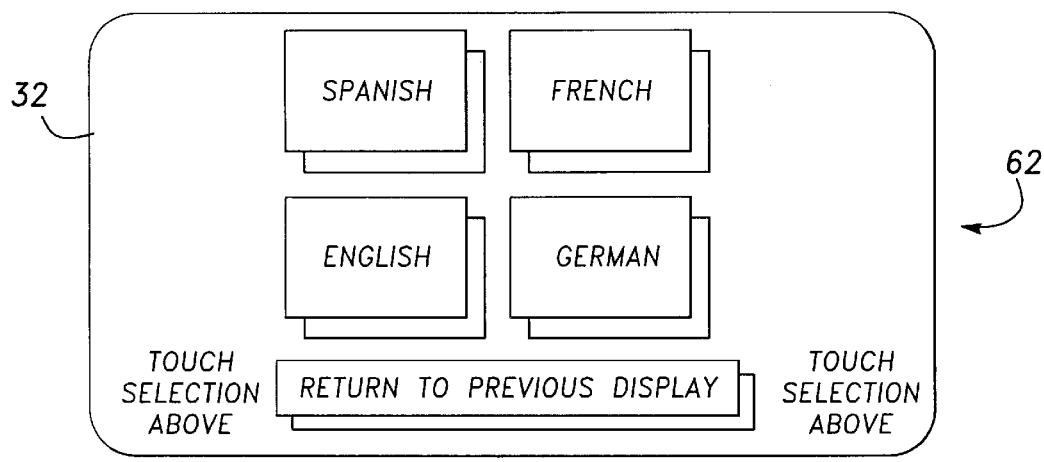
Figure 3C:
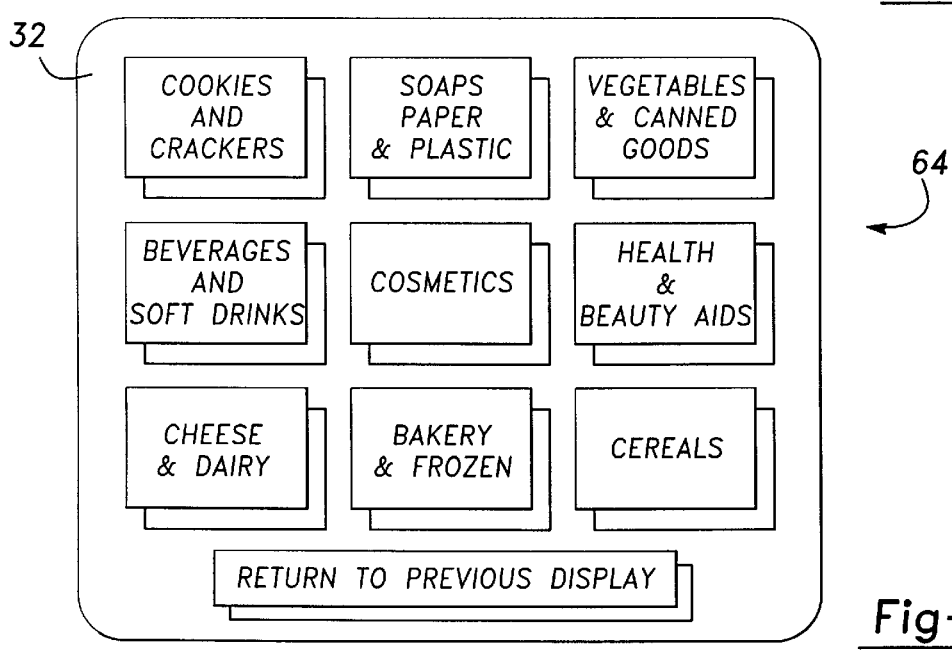
Figure 3D:
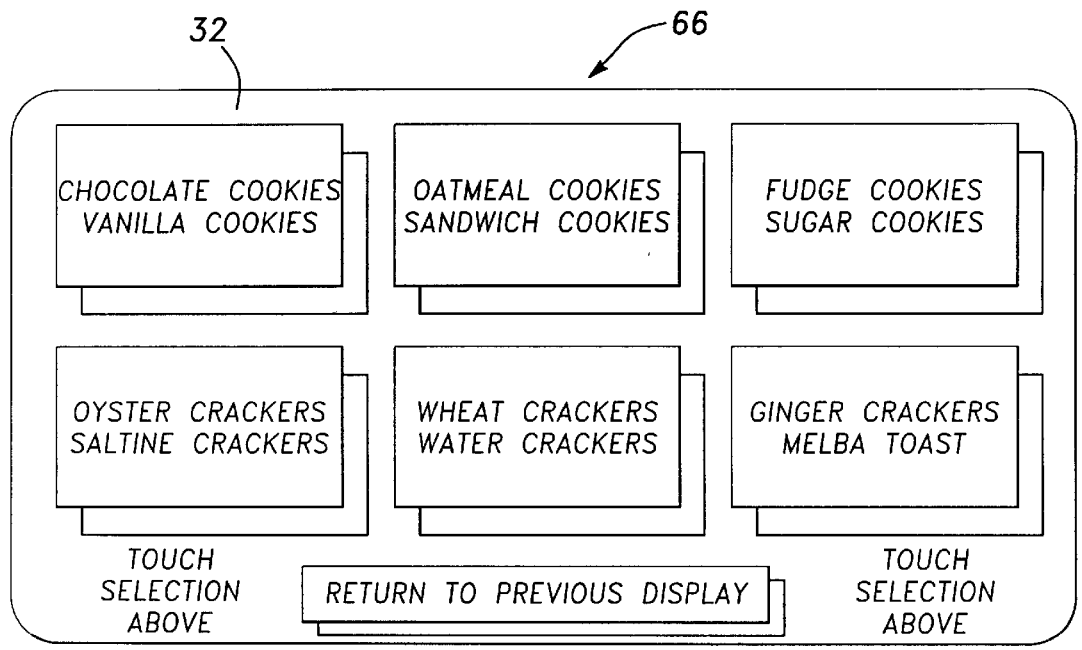
Figure 3E:
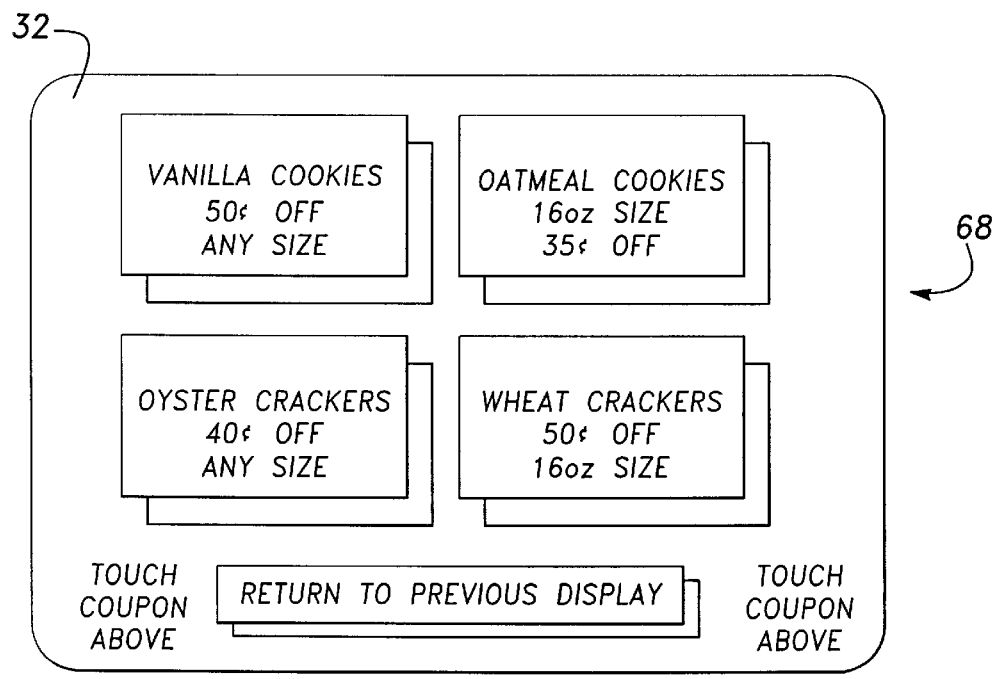
Figure 4:
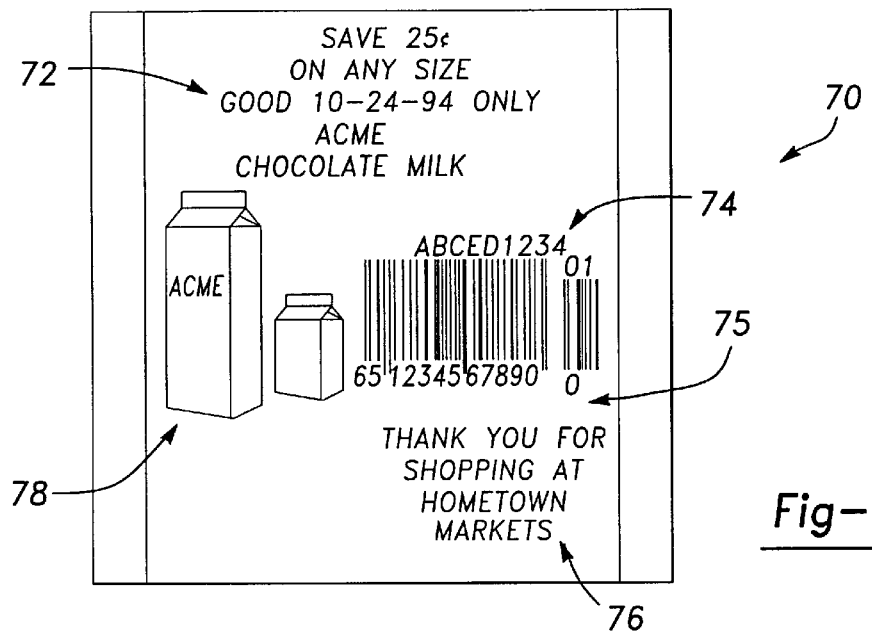
FIG. 4 illustrates a representative coupon generated by the ECDM of FIG. 1.

If a coupon is selected, the printer 38 prints the coupon, such as the coupon shown at 70 in FIG. 4, and dispenses the coupon through the coupon dispense slot 40 at the ECDM 12. Each of the screens shown in FIGS. 3B–3E includes a Return to Previous Display selection, allowing the consumer to scroll forward or backward through the screen selections. Additional subcategories or screen variations may also be added to the touch screen menu without departing from the scope of the invention.

Referring to FIG. 4, the coupon generated by and dispensed from the ECDM is shown at 70. The coupon 70 is preferably valid only on the day of the printing, as is indicated generally at 72 on the coupon 70. However, the length of coupon validity may vary according to predetermined parameters. The coupon may incorporate both store identification data at 74 and a universal product code (UPC) 75 conforming with guidelines set by the Uniform Code Council Inc. (UCC). Alternatively, the data shown at 74 may include manufacturer offer codes. The guidelines for manufacturer coupon UPC codes are set forth in the publicly available UPC Coupon Code Guidelines Manual. Specifically, the manufacturer coupon code is typically a subset of the international 12-digit code having a single digit "5" prefix as set forth by the International Numbering Association (EAN) in Brussels, Belgium.

The coupon 70 is identified by the POS system 18 as being from the system 10 by a "55" or "65" prefix, or some other unassigned prefix, rather than the conventional "5" manufacturer coupon prefix. The POS system software is modified to recognize the "55" or "65" and perform three routines. First, it strips the leading "5" or "6" from the two digit prefix, thereby reducing the code to the standard 12 digit sequence with a "5" prefix. Second, the POS system 18 creates a file in the POS store central office processor memory 48 specifically for redeemed coupons dispensed from the ECDM 12. Third, the POS system processes and redeems the coupon as with conventional coupons. Thus, upon receiving the requisite command from either the ECDM 12 or the store central office computer, the coupon redemption data stored in the POS memory is uploaded thereto. As shown at 76, store advertising indicia is also printed on the coupon. Product logos and graphics identifying the product are printed as shown at 78.

While the above described UPC coding scheme is preferred, it should also be appreciated that a "99" in store distributed coupon two-digit prefix conforming with the UPC Coupon Code Guidelines Manual may also be utilized, depending upon the particular application. It is also contemplated that the UPC code 75 may be modified to comply with EAN 128 parameters or other like code modifications if and when such parameters are adopted and implemented in the future.

Figure 5:
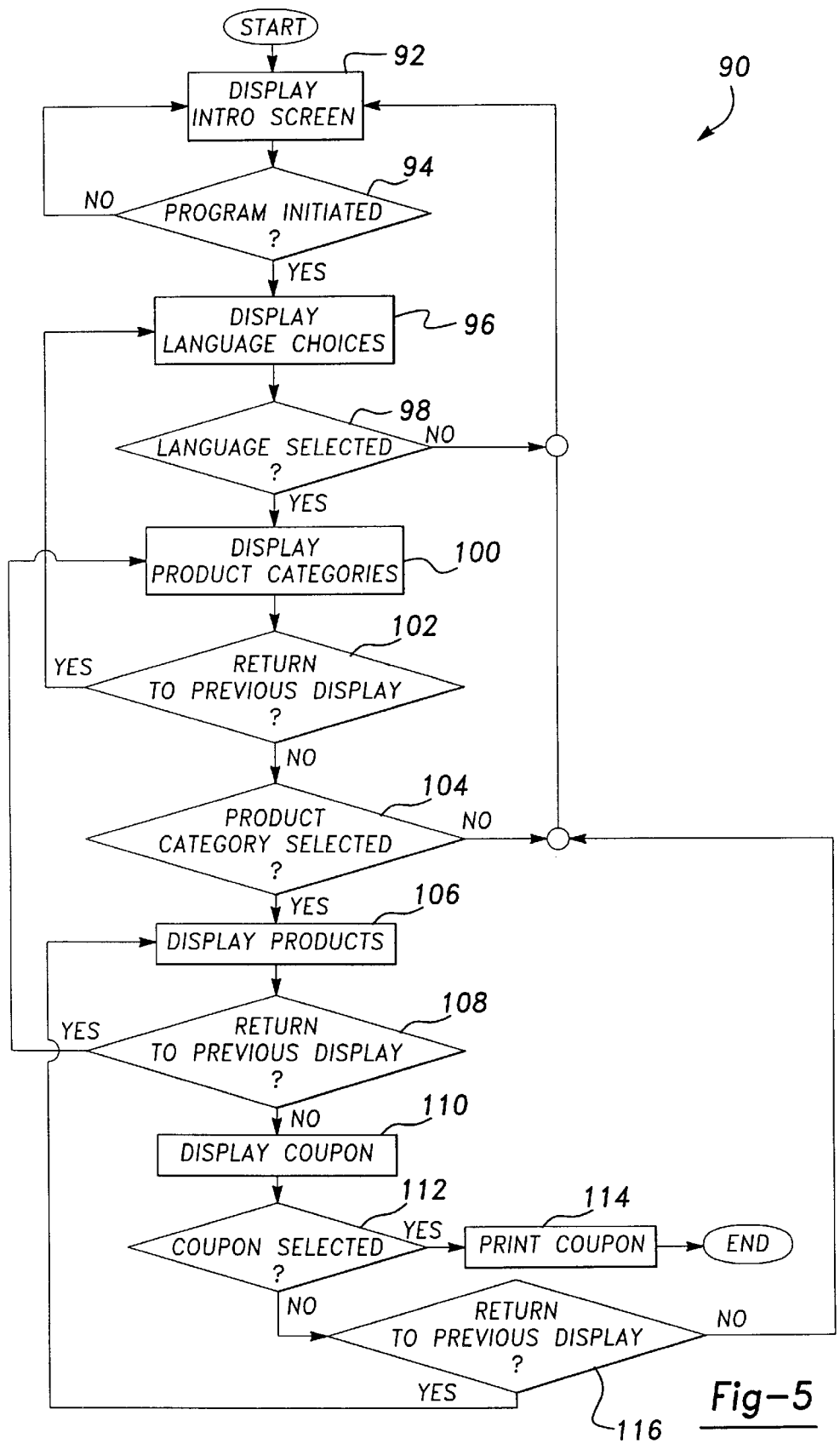
FIG. 5 is a flow diagram illustrating the methodology implemented by the ECDM of FIG. 1.

Turning now to system operation, FIG. 5 illustrates the methodology of the coupon select mode in the present invention generally at 90. At step 92, the system displays the introductory screen 60 of FIG. 3A until a consumer initiates the coupon selection process by touching the touch screen 32. At step 94, the system continuously queries whether the coupon dispense program is initiated through the touch screen 32. At step 96, if the consumer does initiate the system, the display language screen 62 of FIG. 3B is displayed on the touch screen. At step 98, the system queries whether a particular language has been selected. If a particular language has not been selected after a predetermined amount of time, the system defaults to the introductory screen. At step 100, if a particular language is selected, the product category screen 64 of FIG. 3C is displayed.

At step 102, the system determines whether the Return to Previous Display selection has been chosen. If so, the system returns to step 96 to the language selection screen. However, if the selection is not chosen, the system advances to step 104 and determines if a product category is selected within a predetermined amount of time. If a product category is not selected after a predetermined amount of time, the system returns to the introductory screen at step 92. However, if a product category is selected within the predetermined amount of time, the methodology advances to step 106, and the various products having available coupons are displayed on screen 66 of FIG. 3D. At step 108, the system determines whether the consumer has chosen the Return to Previous Display selection. If the Return to Previous Display selection is made, the system returns to the product category screen to step 100. If the Return to Previous Display selection is not made, the system advances to step 110 and displays the particular coupons available as shown on screen 68 of FIG. 3E. At step 112, the system determines whether a coupon has been selected. If no coupon is selected after a predetermined amount of time and the Return to Previous Display selection at step 116 is not made, the system returns to the introductory screen at step 92. If the Return to Previous Display selection is made, the system returns to the product display screen at step 106. If a particular coupon is selected, the coupon is printed at step 114 and the methodology ends. The methodology may be again initiated from the beginning at step 92 after a coupon is printed.

Figure 6:
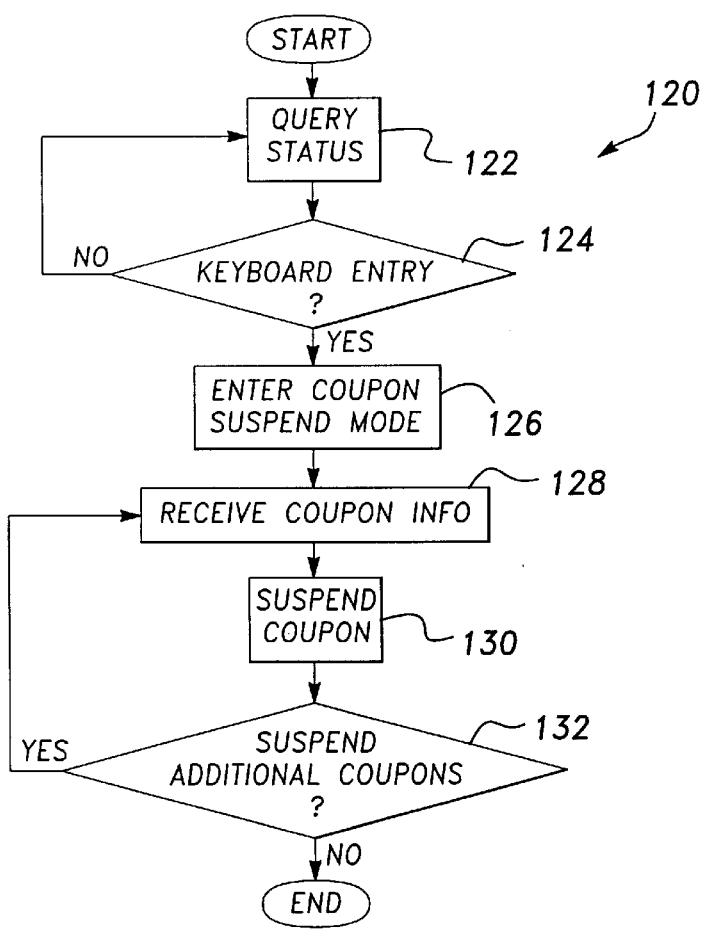
FIG. 6 is a flow diagram illustrating the methodology implemented by the ECDM of FIG. 1 upon the ECDM entering a coupon suspend mode.

Referring to FIG. 6, the system methodology implemented in the present invention for temporarily suspending dispensing of a particular coupon by store personnel is shown generally at 120. At step 122, the system queries the status of the coupon suspend mode. At step 124, the system determines an entry has been at the coupon suspend mechanism 42 or via the touch screen 32. If no entry has been made, the system returns to step 122. However, if an entry has been made by store management, the ECDM enters a coupon suspend mode at step 126. At step 128, the ECDM receives coupon suspend data through the coupon suspend mechanism 42 or the touch screen 32. This coupon suspend data is subsequently entered into the ECDM control device 36, and the dispensing of the particular coupon is suspended at step 130. At step 132, the system determines if additional coupons are to be suspended. If no additional coupon information is entered the coupon suspend mechanism 42 or the touch screen 32, the method ends. However, if additional information is entered, the methodology returns to step 128. The same methodology is followed to reactivate a suspended coupon. It should be appreciated that entry into the coupon suspend mode is limited to store management or other authorized personnel having pre-approved access to the ECDM control device. By restricting access to the ECDM control device, system integrity and security is maintained.

Figure 7:
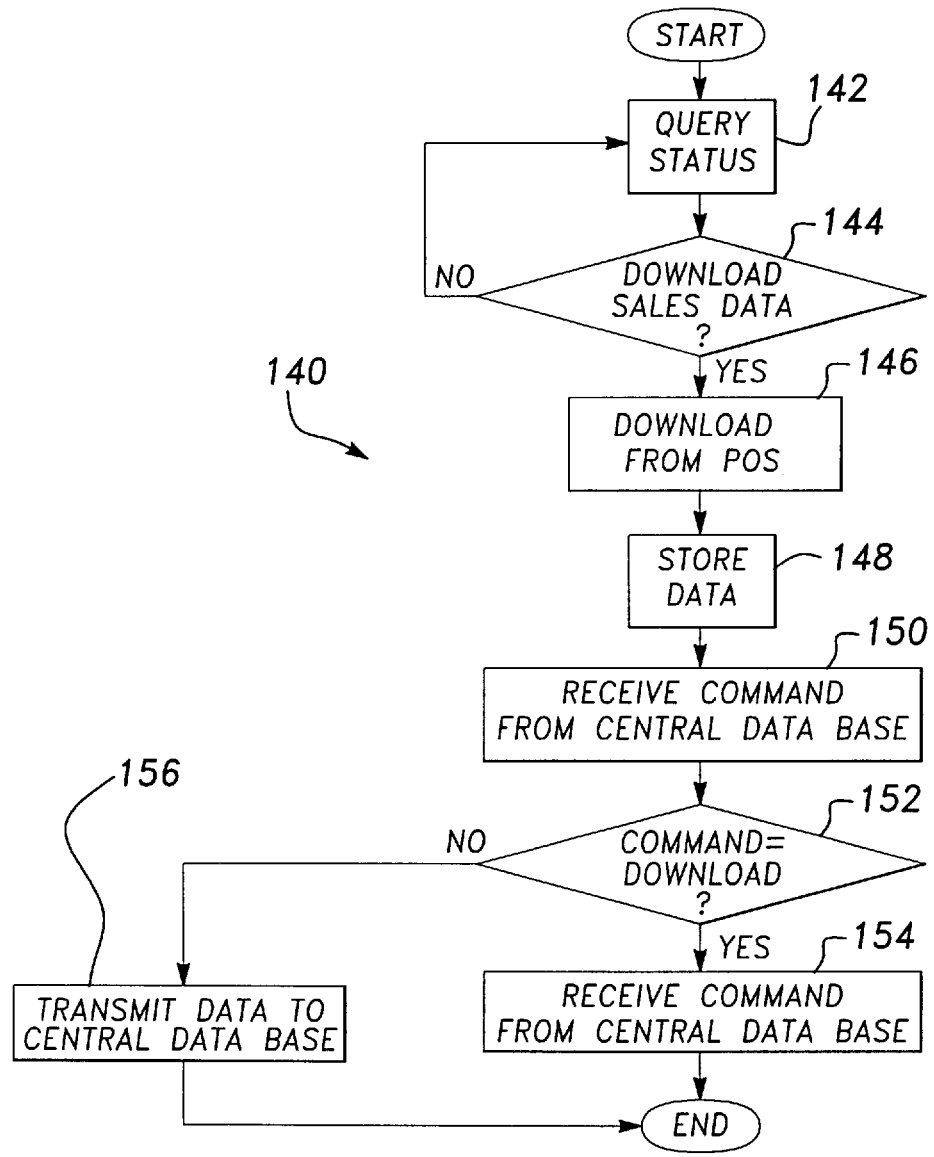
FIG. 7 is a flow diagram illustrating the communication methodology implemented for linking the components of the electronic coupon dispensing system of FIG. 2.

Referring to FIG. 7, system methodology for uploading POS and ECDM data from the ECDM 12 and POS system 18 or store central office processor to the central data base 14 is indicated generally at 140. At step 142, the ECDM queries the system status. At step 144, the ECDM determines whether to download coupon redemption data from the POS system 18. At step 146, if the predetermined time has been reached for downloading coupon redemption data, the ECDM downloads the data from the POS system. If the download period has not been reached, the system continuously queries system status at step 142 until the particular time is reached. At step 148, after the coupon redemption data is downloaded, the ECDM stores coupon-related data, including coupon redemption data, screen selection data and coupon print data, at the ECDM control device 36. At step 150, the ECDM receives a command from the central data base. At step 152, the ECDM determines whether the command is a download command or an upload command. If the command is a download command, the ECDM receives additional coupon add, delete or suspend data from the central data base at step 154 and adds this data to the control device 36. At step 156, if the command is not a download command, the ECDM determines that the command is an upload command. Subsequently, the ECDM transfers the ECDM and POS coupon related data to the central data base for processing. Also, at this point, the store central office processor 21 transfers coupon redemption data to the central data base 14.

Once the central data base 14 receives the coupon redemption data and other coupon-related data from the ECDM and/or the central office processor 21, the central data base 14 transmits certain of the data, according to a predetermined agreement with the manufacturer or store chain, to the manufacturer data base facility 20 or to the central office processor 21. This data gives the manufacturer, or store, product purchase history for a particular product or products, and enables the manufacturer, or store, to more effectively target and promote its products. In addition, POS coupon redemption data enables the manufacturer, or store, to accurately determine reimbursement parameters for particular stores or store chains, thereby eliminating the lengthy and cumbersome process of manually collecting paper coupons, and sending these coupons through conventional accounting facilities and clearing houses in order to reimburse the store. By electronically transmitting coupon redemption data to the manufacturer or store, overall cost of coupon redemption is reduced for both the store and the manufacturer.

In view of the foregoing description, it should be appreciated that the coupon dispensing system of the present invention enables store management and product manufacturers to more effectively target in-store consumers. The coupon dispensing system of the present invention exhibits a great deal of flexibility in that coupons may be added, deleted or suspended from the dispensing system within minutes, thereby eliminating the months of lag time between printing and distributing of conventional paper coupons. The coupon dispensing system of the present invention requires minimal interfacing with existing store POS systems and, except for individual coupon suspensions, is controlled wholly at a central data base facility. The coupon dispensing system of the present invention further eliminates the float associated with present day coupon redemption procedures, thereby enabling both stores and product manufacturers to benefit from faster distribution and redemption of coupons.

While the above detailed description describes the preferred embodiment of the present invention, the invention is susceptible to modification, variation and alteration without deviating from the scope and fair meaning of the subjoined claims.

What is claimed is:

1. A coupon dispensing system, comprising:
  a point of sale system including a terminal having a data reader for reading coupon redemption data, and a point of sale system memory for storing said coupon redemption data;
  an electronic coupon dispenser including a memory for electronically storing a plurality of coupons, a user interface for permitting selection from said plurality of coupons from a coupon menu, and a printer for printing coupons selected at said user interface;
  said electronic coupon dispenser including means for recording and storing coupon-related data based on at least one of coupons viewed at said user interface, coupons printed by said printer, and coupons redeemed at said point of sale system;
  a communication link between said point of sale system and said electronic coupon dispenser for transmitting said coupon redemption data from said point of sale system to said electronic coupon dispenser; and
  a central data base operatively connected to said electronic coupon dispenser for transmitting said plurality of coupons and receiving said coupon-related data;
  said central data base communicating with said electronic coupon dispenser in response to first predetermined parameters, with said point of sale system via said electronic coupon dispenser in response to second predetermined parameters.

2. The system of claim 1, wherein said electronic coupon dispenser captures said coupon-related data and stores said coupon-related data in said electronic coupon dispenser memory.

3. The system of claim 2, wherein said coupon-related data comprises menu selection data, including category selection data, product selection data and coupon dispense data.

4. The system of claim 1, wherein said central data base selectively downloads said coupon redemption data from said point of sale system.

5. The system of claim 1, further comprising coupon dispensing system identification means printed on each coupon for identifying a coupon dispensed from said electronic coupon dispenser.

6. The system of claim 5 wherein said coupon dispensing system identification means comprises a bar code prefix.

7. The system of claim 6, wherein said bar code prefix comprises a two digit numerical prefix.

8. The system of claim 5, wherein said coupon dispensing system identification means is at least one digit coded within a barcode for identifying a coupon dispensed from said electronic coupon dispenser.

9. The system of claim 1, further comprising at least one manufacturer data base in communication with said central data base for downloading said coupon-related data from said central data base.

10. The system of claim 9, wherein said manufacturer data base downloads said coupon-related data from said central data base in batch mode.

11. The system of claim 1, further comprising at least one manufacturer data base in communication with said central data base for downloading said coupon redemption data from said central data base.

12. The system of claim 11, wherein said manufacturer data base downloads said coupon redemption data from said central data base in batch mode.

13. The system of claim 1, further comprising a local electronic coupon dispenser control for selectively temporarily suspending certain of said plurality of coupons.

14. The system of claim 1, wherein said plurality of coupons comprises new coupons to be stored in said electronic coupon dispenser memory, modifications to said plurality of coupons stored in said electronic coupon dispenser memory, and cancellations of said plurality of coupons stored in said electronic coupon dispenser memory.

15. The system of claim 1, wherein said central data base receives said coupon redemption data from at least one of said electronic coupon dispenser, said point of sale system via said electronic coupon dispenser, and a central office processor connected to the point of sale system.

16. A coupon dispensing system, comprising:
  a point of sale system including a terminal having a data reader for reading coupon redemption data, and a point of sale system memory for storing said coupon redemption data;
  a coupon dispensing machine, comprising:
    a memory for electronically storing a plurality of coupons;
    a user interface including a coupon menu for permitting selection from said plurality of coupons stored in said memory;
    a printer for printing coupons selected from said coupon menu;
  said coupon dispensing machine including means for recording and storing coupon-related data based on coupons viewed at said user interface, coupons printed by said printer, and coupons redeemed at said point of sale system; and
  a central data base facility for permitting updating of said plurality of coupons;
  said central database for receiving said coupon redemption data from at least one of said coupon dispensing machine, said point of sale system via said coupon dispensing machine, and a central office processor connected to the point of sale system;
  said central data base facility communicating with said coupon dispensing machine in response to first predetermined parameters and with said point of sale system in response to second predetermined parameters.

17. A method of dispensing coupons, comprising:
  electronically storing a plurality of coupons at a coupon dispensing apparatus;
  displaying a menu of said plurality of electronically stored coupons at said coupon dispensing apparatus;
  sensing selection of a coupon from said plurality of electronically stored coupons at said coupon dispensing apparatus;
  printing said selected coupon at said coupon dispensing apparatus;
  sensing redemption of said selected coupon at a coupon redemption apparatus; said coupon dispensing apparatus including an algorithm for recording and storing coupon-related data based on coupons viewed through said menu of said coupon dispensing apparatus, coupons dispensed during said step of printing, and coupons redeemed at said coupon redemption apparatus; and downloading data from said coupon redemption apparatus generated, in response to said step of sensing redemption of said selected coupon, directly to a central data base in response to first predetermined parameters, or to said central data base through said coupon dispensing apparatus in response to second predetermined parameters.

18. The method of claim 17, further comprising the step of downloading said data generated in response to said step of sensing redemption of said selected coupon to a manufacture data base.

19. The method of claim 17, further comprising the step of periodically updating said plurality of electronically stored coupons.

20. The method of claim 19, wherein said step of periodically updating said plurality of electronically stored coupons comprises adding new coupons, cancelling existing coupons, and suspending existing coupons.

21. The method of claim 17, further comprising the step of suspending one or more of said plurality of electronically stored coupons via coupon suspension means located at said coupon dispensing apparatus.

* * * * *